United States Patent
Choi et al.

(10) Patent No.: US 12,512,171 B2
(45) Date of Patent: Dec. 30, 2025

(54) METHOD FOR FINDING COMMON OPTIMAL READ REFERENCE VOLTAGE OF MULTI-DIES, STORAGE SYSTEM

(71) Applicant: INNOGRIT TECHNOLOGIES CO., LTD., Shanghai (CN)

(72) Inventors: Youngjoon Choi, Shanghai (CN); Goyo Chiang, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 223 days.

(21) Appl. No.: 18/347,378

(22) Filed: Jul. 5, 2023

(65) Prior Publication Data

US 2024/0013843 A1 Jan. 11, 2024

(30) Foreign Application Priority Data

Jul. 5, 2022 (CN) .......................... 202210793889.8

(51) Int. Cl.
*G11C 16/28* (2006.01)
*G11C 16/34* (2006.01)

(52) U.S. Cl.
CPC ............ *G11C 16/349* (2013.01); *G11C 16/28* (2013.01); *G11C 16/34* (2013.01); *G11C 16/3418* (2013.01); *G11C 16/3459* (2013.01)

(58) Field of Classification Search
CPC ... G11C 16/349; G11C 16/34; G11C 16/3459; G11C 8/12; G11C 2029/0411; G11C 16/26; G11C 7/04; G11C 29/021; G11C 29/028; G11C 29/26; G11C 29/42; G11C 16/28; G11C 16/3418; G06F 13/1668
See application file for complete search history.

(56) References Cited

U.S. PATENT DOCUMENTS

| | | | | |
|---|---|---|---|---|
| 2009/0003071 A1* | 1/2009 | Nishihara | ............... | H10B 41/35 257/E27.081 |
| 2012/0026775 A1* | 2/2012 | Yamada | ................. | H10B 43/27 365/94 |
| 2012/0294104 A1* | 11/2012 | Mun | ................... | G11C 13/0004 365/189.011 |
| 2018/0091170 A1* | 3/2018 | Asami | ................. | G11C 11/5642 |

(Continued)

FOREIGN PATENT DOCUMENTS

CN 113205849 A 8/2021

OTHER PUBLICATIONS

Office Action issued in Chinese Application No. 202210793889.8, dated Apr. 26, 2025, with English translation.

*Primary Examiner* — Jay W. Radke
(74) *Attorney, Agent, or Firm* — HSML P.C.

(57) ABSTRACT

A method for finding a common optimal read reference voltage of multi-dies and a storage system includes: obtaining voltage distributions of each block in the multi-dies at different read and write temperatures and/or different P/E cycles; determining optimal read reference voltages for all blocks in the multi-dies; obtaining the number of blocks corresponding to different optimal read reference voltages according to the optimal read reference voltages of all blocks in the multi-dies; and selecting the optimal read reference voltage with the most occurrences as the common optimal read reference voltage according to the number of blocks corresponding to the different optimal read reference voltages.

10 Claims, 3 Drawing Sheets

(56) References Cited

U.S. PATENT DOCUMENTS

2019/0102097 A1* 4/2019 Madraswala .......... G11C 16/26
2024/0127893 A1* 4/2024 Takeda .................. G11C 16/26
2024/0427498 A1* 12/2024 Hong .................... G06F 3/0619

* cited by examiner

METHOD FOR FINDING COMMON OPTIMAL READ REFERENCE VOLTAGE OF MULTI-DIES, STORAGE SYSTEM

CROSS-REFERENCE TO PRIOR APPLICATION

This application claims priority to Chinese Application number CN2022107938898 which is filed on Jul. 1, 2022, the contents of which are incorporated herein by reference.

TECHNICAL FIELD

The present disclosure relates to the technical field of data storage, and in particular to a method for finding a common optimal read reference voltage of multi-dies and a storage system.

BACKGROUND

Non-volatile memory system has become an important way of storing data because the data stored within will not be lost due to power failure. Among these non-volatile memory systems, NAND flash memory is popular because of its advantages of low power consumption and high performance.

In order to verify the correctness of the non-volatile memory product, it is necessary to first accurately adjust the threshold voltage of the reference cell of the non-volatile memory chip to be tested. Take SLC (Single Layer Cell) flash memory as an example, briefly introduce its readout principle: apply the same gate terminal and source terminal voltages to the memory cell and the reference cell, compare their drain terminal currents, and if the current of the memory cell is larger than the reference cell, it is defined as storing "1", otherwise, it is defined as storing "0". Therefore, the threshold voltage of the reference cell is the judgment point for storing data, and is the basis of the entire flash memory readout system. It needs to be adjusted more accurately before testing. As the integration density of a flash memory increases, operation speed may increase, but read operation errors may also increase due to the effects on threshold voltage distributions of changes in the operating environment.

SUMMARY OF THE INVENTION

An object of the present application is to provide a method for finding a common optimal read reference voltage of multi-dies and a storage system, which can accurately adjust the common reference voltage of multi-dies.

This application discloses a method for finding a common optimal read reference voltage of multi-dies, the method includes the following steps:
  obtaining voltage distributions of each block in the multi-dies at different read and write temperatures and/or different P/E cycles;
  determining optimal read reference voltages for all blocks in the multi-dies;
  obtaining the number of blocks corresponding to different optimal read reference voltages according to the optimal read reference voltages of all blocks in the multi-dies; and
  selecting the optimal read reference voltage with the most occurrences as the common optimal read reference voltage according to the number of blocks corresponding to the different optimal read reference voltages.

In one embodiment, the step of obtaining voltage distributions of each block in the multi-dies at different read and write temperatures and/or different P/E cycles further comprises:
  obtaining voltage distributions for one of the following groups or a combination thereof:
    voltage distribution of writing at a low temperature and reading at a high temperature;
    voltage distribution of writing at a low temperature and reading at a room temperature;
    voltage distribution of writing at a low temperature and reading at low temperature;
    voltage distribution of writing at a room temperature and reading at a high temperature;
    voltage distribution of writing at a room temperature and reading at a room temperature;
    voltage distribution of writing at a room temperature and reading at a low temperature;
    voltage distribution of writing at a high temperature and reading at a high temperature;
    voltage distribution of writing at high temperature and reading at room temperature;
    voltage distribution of writing at a high temperature and reading at a low temperature;
  wherein, the low temperature indicates that the temperature is lower than 0° C., the room temperature indicates that the temperature range is 20° C. to 25° C., the high temperature indicates that the temperature is higher than 70° C.; and
  obtaining voltage distributions for one of the following groups or a combination thereof:
    a voltage distribution when the P/E cycle is not performed;
    a voltage distribution when the P/E cycle has been performed a predetermined number of times.

In one embodiment, the step of determining optimal read reference voltages for all blocks in the multi-dies further comprises: obtaining voltages corresponding to a highest error bit count of all pages of each block, and selecting a voltage corresponding to a minimum value of the highest error bit count of all pages as the optimal read reference voltage.

In one embodiment, the step of determining optimal read reference voltages for all blocks in the multi-dies further comprises: obtaining a first boundary voltage corresponding to a highest error bit count that does not cause UECC and a second boundary voltage corresponding to the highest error bit count that does not cause UECC in all pages of each block, and using a center value of the first boundary voltage and the second boundary voltage as the optimal read reference voltage.

In one embodiment, the method further comprises: determining a block in the multi-dies that exceeds a predetermined range of the common optimal read reference voltage as a bad block.

The application also discloses a storage system, comprising:
  one or more NAND devices;
  a memory controller coupled to the one or more NAND devices, and the memory controller is configured to perform the following steps:
    obtaining voltage distributions of each block in the multi-dies at different read and write temperatures and/or different P/E cycles;
    determining optimal read reference voltages for all blocks in the multi-dies;

obtaining the number of blocks corresponding to different optimal read reference voltages according to the optimal read reference voltages of all blocks in the multi-dies;

selecting an optimal read reference voltage with the most occurrences as a common optimal read reference voltage according to the number of blocks corresponding to the different optimal read reference voltages.

In one embodiment, the controller obtains voltage distributions of each block in the multi-dies at different read and write temperatures and/or different P/E cycles, further comprises:

obtaining voltage distributions for one of the following groups or a combination thereof:

voltage distribution of writing at a low temperature and reading at a high temperature;

voltage distribution of writing at a low temperature and reading at a room temperature;

voltage distribution of writing at a low temperature and reading at low temperature;

voltage distribution of writing at a room temperature and reading at a high temperature;

voltage distribution of writing at a room temperature and reading at a room temperature;

voltage distribution of writing at a room temperature and reading at a low temperature;

voltage distribution of writing at a high temperature and reading at a high temperature;

voltage distribution of writing at high temperature and reading at room temperature;

voltage distribution of writing at a high temperature and reading at a low temperature;

wherein, the low temperature indicates that the temperature is lower than 0° C., the room temperature indicates that the temperature range is 20° C. to 25° C., the high temperature indicates that the temperature is higher than 70° C.; and obtaining voltage distributions for one of the following groups or a combination thereof:

a voltage distribution when the P/E cycle is not performed;

a voltage distribution when the P/E cycle has been performed a predetermined number of times.

In one embodiment, the controller determines optimal read reference voltages for all blocks in the multi-dies, further comprises: obtaining voltages corresponding to a highest error bit count of all pages of each block, and selecting a voltage corresponding to a minimum value of the highest error bit count of all pages as the optimal read reference voltage.

In one embodiment, the controller determines optimal read reference voltages for all blocks in the multi-dies, further comprises: obtaining a first boundary voltage corresponding to a highest error bit count that does not cause UECC and a second boundary voltage corresponding to the highest error bit count that does not cause UECC in all pages of each block, and using a center value of the first boundary voltage and the second boundary voltage as the optimal read reference voltage.

In one embodiment, the controller is further configured to: determine a block in the multi-dies that exceeds a predetermined range of the common optimal read reference voltage as a bad block.

In the implementation of this application, obtaining voltage distributions of each block in the multi-dies at different read and write temperatures and/or different P/E cycles, determining optimal read reference voltages for all blocks in the multi-dies, obtaining the number of blocks corresponding to different optimal read reference voltages according to the optimal read reference voltages of all blocks in the multi-dies; according to the number of blocks corresponding to the different optimal read reference voltages, selecting the optimal read reference voltage with the most occurrences as the common optimal read reference voltage. The present application can adjust the common optimal read reference voltage of multi-dies.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION

In the following description, numerous technical details are set forth in order to provide the readers with a better understanding of the present application. However, those skilled in the art can understand that the technical solutions claimed in the present application can be implemented without these technical details and various changes and modifications based on the following embodiments.

In order to make the objects, technical solutions and advantages of the present application clearer, embodiments of the present application will be further described in detail below with reference to the accompanying drawings.

Figure 1:
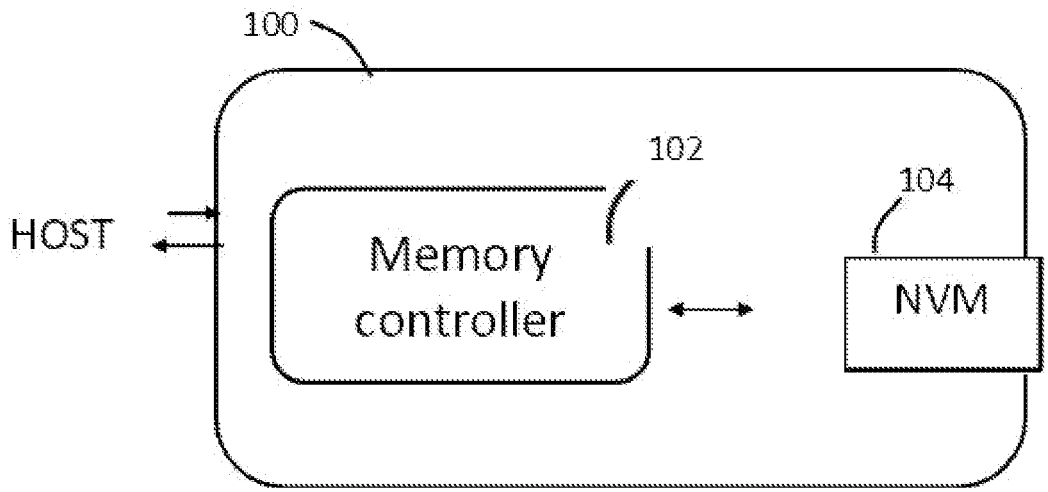
FIG. 1 is a block diagram of a storage system in an embodiment of this application.

The present disclosure provides apparatus, systems, and methods for finding a common optimal read reference voltage of multi-dies to read data stored in non-volatile memory (NVM) storage devices encoded with error correction code (ECC) (e.g., Turbo, low density parity check (LDPC), and polar codes, etc.). FIG. 1 schematically illustrates a non-volatile memory system 100 in an embodiment of the present disclosure. The non-volatile memory system 100 may include a non-volatile memory controller 102 and a non-volatile memory device 104. When the non-volatile storage system 100 is connected to a host, the non-volatile storage system may provide data storage and/or access to stored data for the host.

Figure 2:
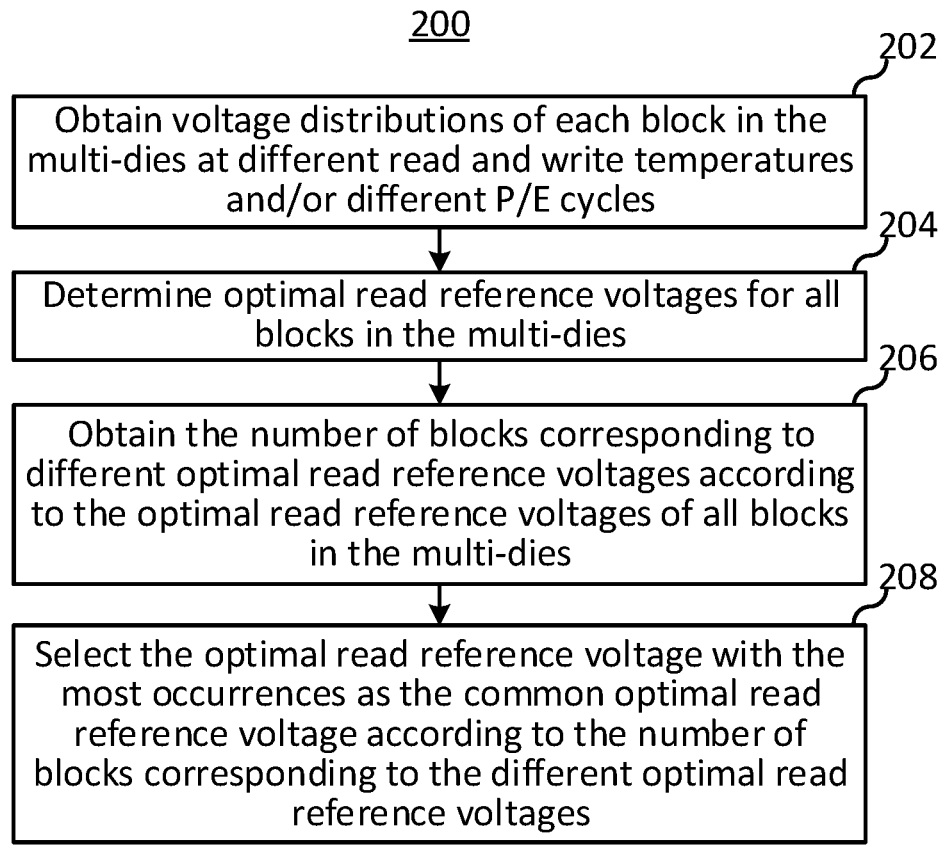
FIG. 2 is schematic flowchart of a method for finding a common optimal read reference voltage of multi-dies in an embodiment of the present application.

The non-volatile memory device 104 may be a non-volatile memory (NVM) based storage device, for example, a NAND device. It should be noted that the non-volatile storage system 100 may include a plurality of non-volatile memory devices, and the non-volatile memory device 104 may be denoted as representative of the plurality of non-volatile memory devices. The non-volatile memory device may include a plurality of dies. Each die may include one or more planes, and each plane may include a plurality of blocks. A block may include a plurality of cells organized in a two-dimensional array. The cells in each row may be coupled to one word line (WL) and referred as a page (e.g., a physical page). FIG. 2 schematically shows a flowchart of the method 200 for finding a common optimal read reference voltage of multi-dies in an embodiment of the present disclosure, the method 200 includes the following steps:

At step 202: voltage distributions of each block in the multi-dies at different read and write temperatures and/or different P/E cycles are obtained. It should be understood that, in this embodiment, voltage distributions corresponding to combinations of different read and write temperatures and/or the number of P/E cycles of each block may be obtained.

For example, in one embodiment, the voltage distributions for one of the following groups or a combination thereof are obtained:
(1) voltage distribution of writing at a low temperature and reading at a high temperature;
(2) voltage distribution of writing at a low temperature and reading at a room temperature;
(3) voltage distribution of writing at a low temperature and reading at a low temperature;
(4) voltage distribution of writing at room temperature and reading at high temperature;
(5) voltage distribution of writing at a room temperature and reading at a room temperature;
(6) voltage distribution of writing at a room temperature and reading at a low temperature;
(7) voltage distribution of writing at a high temperature and reading at a high temperature;
(8) voltage distribution of writing at a high temperature and reading at a room temperature;
(9) voltage distribution of writing at a high temperature and reading at a low temperature.

Wherein, the low temperature indicates that the temperature is lower than 0° C., the room temperature indicates that the temperature range is 20° C. to 25° C., the high temperature indicates that the temperature is higher than 70° C.

As another example, in one embodiment, the voltage distributions for one of the following groups or a combination thereof are obtained:
(1) a voltage distribution when the P/E cycle is not performed;
(2) a voltage distribution when the P/E cycle has been performed a predetermined number of times.

The number of P/E cycles may be used to indicate lifetime of the non-volatile memory device. The predetermined number of cycles may be specifically set according to the NAND device.

It will be appreciated that a voltage distribution may be obtained for a combination of any two of the above two sets. Thus, in one embodiment, 18 voltage distributions corresponding to different combinations may be obtained. It should be noted that other combinations may also be used in other embodiments of the present application.

Figure 3:
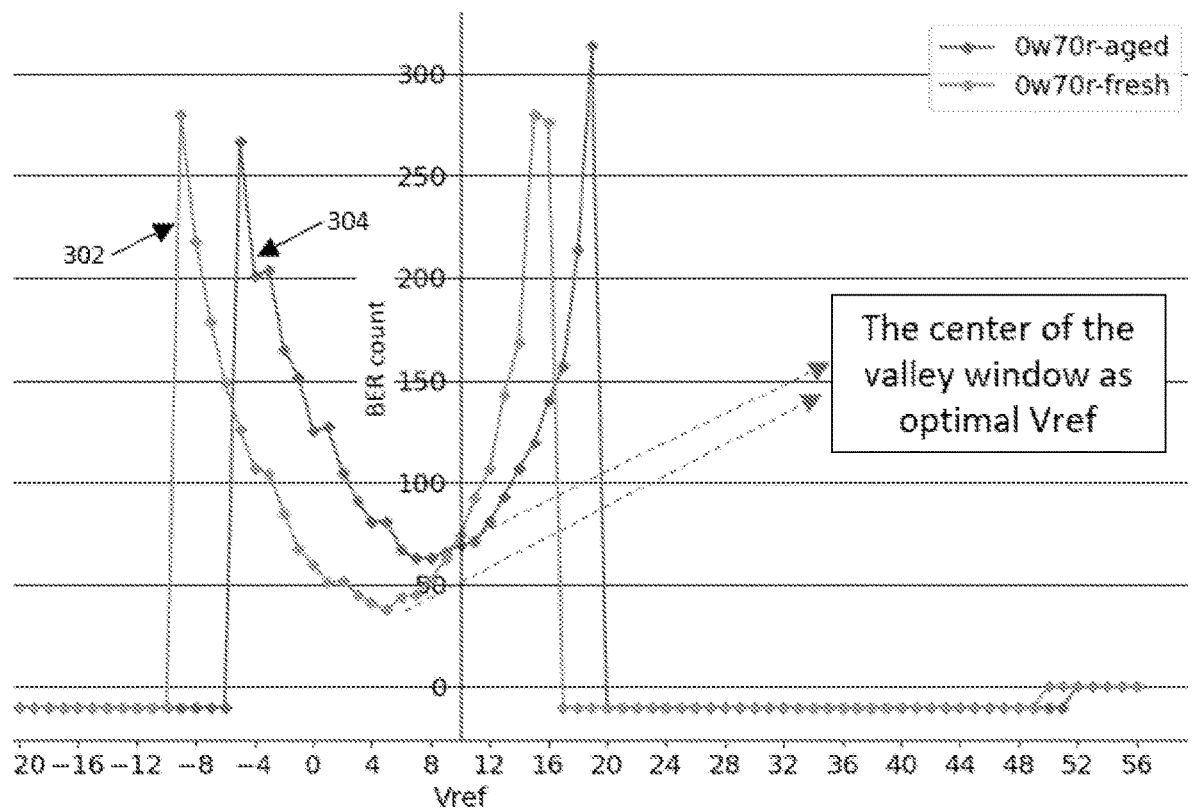
FIG. 3 is a voltage distribution diagram at different read/write temperatures and P/E cycles in an embodiment of the present application.

FIG. 3 is a voltage distribution diagram at different read/write temperatures and P/E cycles in an embodiment of the present application. The curve 302 is, for example, a voltage distribution obtained by performing writing at 0° C. and reading at 70° C. on a sample block that has not undergone P/E cycle (that is, a healthy sample block), and the curve 304 is, for example, a voltage distribution obtained by performing writing at 0° C. and reading at 70° C. on a sample block that has undergone P/E cycles (that is, an aged sample block).

At step 204, optimal read reference voltages for all blocks in the multi-dies are determined.

In one embodiment, voltages corresponding to a highest error bit count of all pages of each block are obtained, and a voltage corresponding to a minimum value of the highest error bit count of all pages is selected as the optimal read reference voltage.

Generally, the optimal read reference voltage of all pages of each block is determined by scanning read reference voltage distributions of each page, finding the highest error bit count of all pages of each read reference voltage distribution under an error correction code (ECC) limit, and identifying the voltage with the lowest error bit count as the optimal reference voltage for the block. The valley window corresponding to the highest error bit count of all pages under ECC limit is usually asymmetric. Since the center of the valley window under ECC limit provides a more balanced edge reference voltage distance than the lowest error bit count point, the reference voltage in its center may be selected as the common optimal reference voltage.

Figure 4:
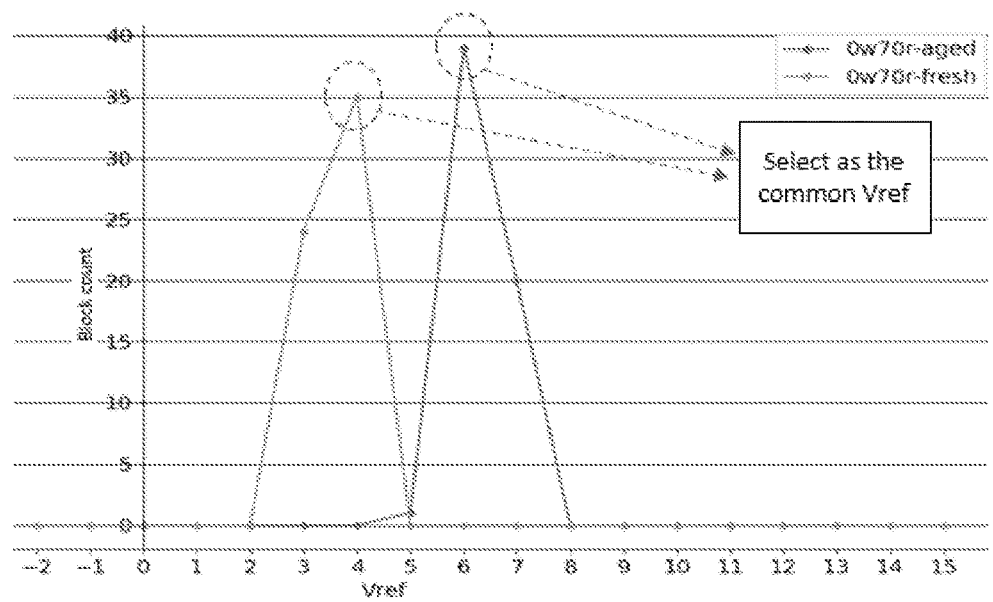
FIG. 4 is a distribution diagram of an optimal read reference voltage and the number of corresponding blocks in an embodiment of the present application.

At step 206: the number of blocks corresponding to different optimal read reference voltages according to the optimal read reference voltages of all the blocks in the multi-dies are obtained. FIG. 4 is a distribution diagram of an optimal read reference voltage and the number of corresponding blocks in an embodiment of the present application.

At step 208, according to the number of the blocks corresponding to the different optimal read reference voltages, the optimal read reference voltage with the most occurrences is selected as the common optimal read reference voltage.

Figure 5:
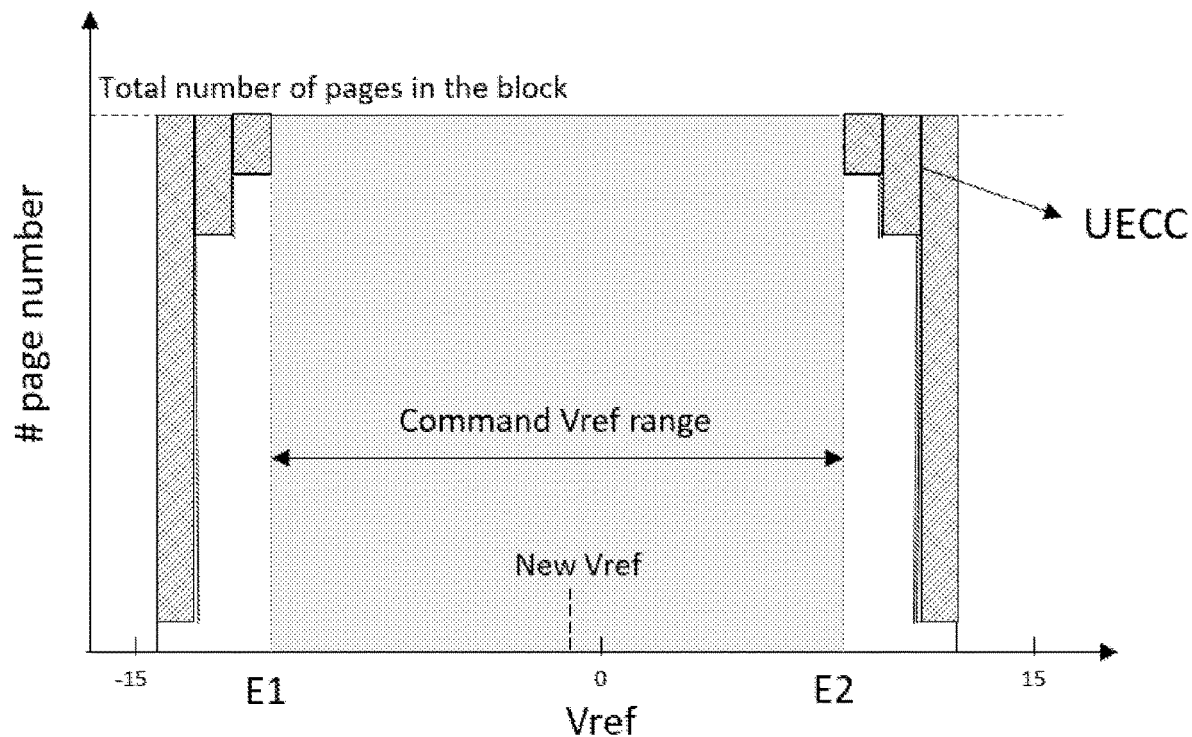
FIG. 5 schematically illustrates the number of pages corresponding to different reference voltages in an embodiment of the present application.
Figure 6:
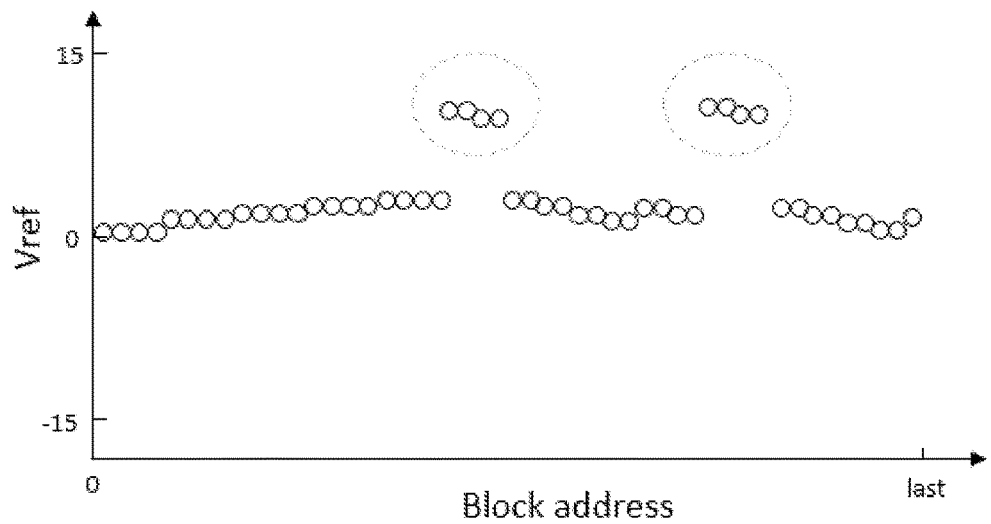
FIG. 6 is a reference voltage distribution corresponding to different blocks in an embodiment of the present application.

In another embodiment, a first boundary voltage corresponding to a highest error bit count that does not cause UECC and a second boundary voltage corresponding to the highest error bit count that does not cause UECC in all pages of each block are obtained, and a center value of the first boundary voltage and the second boundary voltage is selected as the optimal read reference voltage. In this embodiment, the number of times of reference voltage scanning can be reduced. FIG. 5 shows the number of pages corresponding to different reference voltages in an embodiment of the present application. The first boundary voltage E1 that does not cause UECC and the second boundary voltage E2 that does not cause UECC are respectively obtained, and the center value of the boundary voltages E1 and E2 is used as the optimal read reference voltage. FIG. 6 is a reference voltage distribution corresponding to different blocks in an embodiment of the present application. The reference voltage with the most occurrences is used as the common optimal read reference voltage. In addition, in other embodiments, the method further comprises: determining a block in the multi-dies that exceeds a predetermined range of the common optimal read reference voltage as a bad block, such as the block identified in the dotted circle in FIG. 6.

This application also provides a storage system, referring again to the storage system 100 shown in FIG. 1. The memory controller 102 may include a processor, a memory, and an ECC engine. The processor may be a computer processor, such as, but not limited to, a microprocessor or microcontroller. The memory may be a non-transitory computer-readable storage medium, such as DRAM or SRAM, to store computer-executable instructions that will be executed by the processor. The ECC engine can correct errors in storage data retrieved from memory device 104. The memory controller may be configured to perform the following steps: obtain voltage distributions of each block in the multi-dies at different read and write temperatures and/or different P/E cycles, determine optimal read reference voltages for all blocks in the multi-dies, obtain the number of blocks corresponding to different optimal read reference voltages according to the optimal read reference voltages of all blocks in the multi-dies, select an optimal read reference voltage with the most occurrences as a common optimal read reference voltage according to the number of blocks corresponding to the different optimal read reference voltages.

It should be noted that in this specification of the application, relational terms such as the first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a multiple elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. A method for finding a common optimal read reference voltage of multi-dies, comprising:
   obtaining voltage distributions of each block in the multi-dies at different read and write temperatures and/or different P/E cycles;
   determining optimal read reference voltages for all blocks in the multi-dies;
   obtaining the number of blocks corresponding to different optimal read reference voltages according to the optimal read reference voltages of all blocks in the multi-dies; and
   selecting the optimal read reference voltage with the most occurrences as the common optimal read reference voltage according to the number of blocks corresponding to the different optimal read reference voltages.

2. The method for finding a common optimal read reference voltage of multi-dies of claim 1, wherein the step of obtaining voltage distributions of each block in the multi-dies at different read and write temperatures and/or different P/E cycles further comprises:
   obtaining voltage distributions for one of the following groups or a combination thereof:
      voltage distribution of writing at a low temperature and reading at a high temperature;
      voltage distribution of writing at a low temperature and reading at a room temperature;
      voltage distribution of writing at a low temperature and reading at low temperature;
      voltage distribution of writing at a room temperature and reading at a high temperature;
      voltage distribution of writing at a room temperature and reading at a room temperature;
      voltage distribution of writing at a room temperature and reading at a low temperature;
      voltage distribution of writing at a high temperature and reading at a high temperature;
      voltage distribution of writing at high temperature and reading at room temperature;
      voltage distribution of writing at a high temperature and reading at a low temperature;
      wherein, the low temperature indicates that the temperature is lower than 0° C., the room temperature indicates that the temperature range is 20° C. to 25° C., the high temperature indicates that the temperature is higher than 70° C.; and
   obtaining voltage distributions for one of the following groups or a combination thereof:
      a voltage distribution when the P/E cycle is not performed;
      a voltage distribution when the P/E cycle has been performed a predetermined number of times.

3. The method for finding a common optimal read reference voltage of multi-dies of claim 1, wherein the step of determining optimal read reference voltages for all blocks in the multi-dies further comprises: obtaining voltages corresponding to a highest error bit count of all pages of each block, and selecting a voltage corresponding to a minimum value of the highest error bit count of all pages as the optimal read reference voltage.

4. The method for finding a common optimal read reference voltage of multi-dies of claim 1, wherein the step of determining optimal read reference voltages for all blocks in the multi-dies further comprises: obtaining a first boundary voltage corresponding to a highest error bit count that does not cause UECC and a second boundary voltage corresponding to the highest error bit count that does not cause UECC in all pages of each block, and using a center value of the first boundary voltage and the second boundary voltage as the optimal read reference voltage.

5. The method for finding a common optimal read reference voltage of multi-dies of claim 1, further comprising: determining a block in the multi-dies that exceeds a predetermined range of the common optimal read reference voltage as a bad block.

6. A storage system, comprising:
one or more NAND devices; and
a memory controller coupled to the one or more NAND devices, and the memory controller is configured to perform the following steps:
obtaining voltage distributions of each block in multi-dies at different read and write temperatures and/or different P/E cycles;
determining optimal read reference voltages for all blocks in the multi-dies;
obtaining the number of blocks corresponding to different optimal read reference voltages according to the optimal read reference voltages of all blocks in the multi-dies; and
selecting an optimal read reference voltage with the most occurrences as a common optimal read reference voltage according to the number of blocks corresponding to the different optimal read reference voltages.

7. The storage system of claim 6, wherein the controller obtains voltage distributions of each block in the multi-dies at different read and write temperatures and/or different P/E cycles, further comprises:
obtaining voltage distributions for one of the following groups or a combination thereof:
voltage distribution of writing at a low temperature and reading at high temperature;
voltage distribution of writing at a low temperature and reading at a room temperature;
voltage distribution of writing at a low temperature and reading at a low temperature;
voltage distribution of writing at a room temperature and reading at a high temperature;
voltage distribution of writing at a room temperature and reading at a room temperature;
voltage distribution of writing at a room temperature and reading at a low temperature;
voltage distribution of writing at a high temperature and reading at a high temperature;
voltage distribution of writing at high temperature and reading at a room temperature;
voltage distribution of writing at a high temperature and reading at a low temperature;
wherein, the low temperature indicates that the temperature is lower than 0° C., the room temperature indicates that the temperature range is 20° C. to 25° C., the high temperature indicates that the temperature is higher than 70° C.;
obtaining voltage distributions for one of the following groups or a combination thereof:
a voltage distribution when the P/E cycle is not performed;
a voltage distribution when the P/E cycle has been performed a predetermined number of times.

8. The storage system of claim 6, wherein the controller determines optimal read reference voltages for all blocks in the multi-dies, further comprises: obtaining voltages corresponding to a highest error bit count of all pages of each block, and selecting a voltage corresponding to a minimum value of the highest error bit count of all pages as the optimal read reference voltage.

9. The storage system of claim 6, wherein the controller determines optimal read reference voltages for all blocks in the multi-dies, further comprises: obtaining a first boundary voltage corresponding to a highest error bit count that does not cause UECC and a second boundary voltage corresponding to the highest error bit count that does not cause UECC in all pages of each block, and using a center value of the first boundary voltage and the second boundary voltage as the optimal read reference voltage.

10. The storage system of claim 6, wherein the controller is further configured to: determine a block in the multi-dies that exceeds a predetermined range of the common optimal read reference voltage as a bad block.

* * * * *